United States Patent Office 3,563,675
Patented Feb. 16, 1971

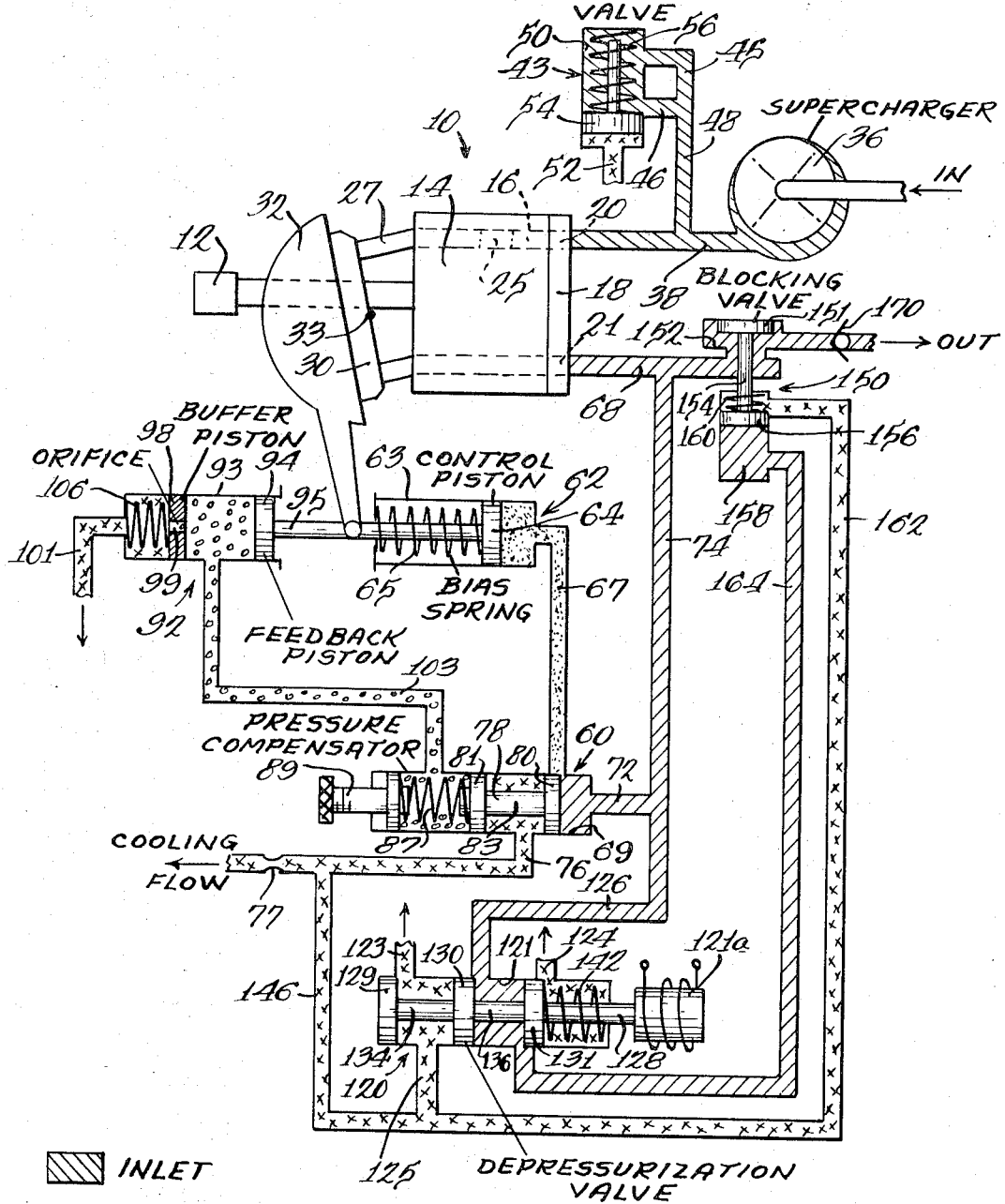

3,563,675
HYDRAULIC PUMP
Donald A. Straznickas, Rockford, Ill., assignor to Sundstrand Corporation, a corporation of Delaware
Filed Oct. 11, 1968, Ser. No. 766,879
Int. Cl. F04b 1/26, 23/12
U.S. Cl. 417—222    10 Claims

ABSTRACT OF THE DISCLOSURE

A pressure compensated variable displacement pump for maintaining a substantially constant pump discharge pressure with a depressurization valve for selectively effecting a reduction in pump discharge pressure by pressurizing the normally low pressure side of a pressure compensator valve constructed to normally maintain a predetermined high pump discharge pressure.

BACKGROUND OF THE INVENTION

Variable displacement pressure compensated pumps are conventional in the hydraulic energy translating art and usually include a pressure compensator valve for maintaining a substantially constant high pressure fluid discharge from the pump. An exemplary pressure compensator valve for this purpose includes a movable valve member biased in one direction by a spring and in the other direction by fluid pressure in the main discharge passage from the pump. As the pump pressure exceeds a predetermined value it moves the compensator valve to a position where throttled discharge pressure is ported to a fluid operable displacement control motor to reduce the displacement of the pump in opposition to the biasing force of a spring and/or other forces acting on the cam or swashplate. This reduces the outlet pressure of the pump back to the desired value where the compensator valve assumes a modulating position.

Upon a reduction in pump discharge pressure below the desired predetermined high value the spring will move the valve to a position permitting drainage flow from the fluid operable displacement control motor permitting the cam to move to an increased displacement position under the influence of the biasing forces thereby increasing the discharge pressure back to the predetermined desired value where the valve member again assumes a modulating position.

Pumps of this general construction have applicability in many systems, one of which is in modern aircraft where an auxiliary pump unit is desirable to maintain a constant pressure flow for hydraulic systems in the aircraft. In some cases, however, it is not desirable that the auxiliary pump unit impose a load on the aircraft prime mover, which normally rotates the pump. Such a situation occurs, for example, during the starting cycle of the aircraft prime movers. To reduce the load imposed upon the prime mover selectively it has been conventional to provide a depressurization control in these pressure compensated systems for the purpose of selectively reducing the outlet pressure and displacement of the pump when the normally high pressure discharge is not required. Several depressurization schemes have been devised in the past but most of these have the disadvantage of permitting leakage of the control fluid in the fluid operable displacement control motor. This leakage is a significant disadvantage in pressure compensated systems and detracts from the accuracy of the control since these systems are sensitive to extraneous control leakages so it is highly desirable that control leakages and restrictions be avoided.

SUMMARY OF THE PRESENT INVENTION

In accordance with the present invention a depressurization system is provided for a variable displacement pressure compensated pump that does not require or result in leakage of control flow or restriction of control flow to the fluid operable displacement control motor and thus provides a pressure compensated control system of higher accuracy than heretofore known in the prior art. To achieve this objective the present depressurization scheme includes a depressurization valve that when activated connects the normally low pressure drain side of the pressure compensated valve to high pressure discharge from the pump so that effectively both sides of the pressure compensated valve are pressurized and the displacement control motor is thereby pressurized regardless of pressure compensator valve position, and the displacement of the pump is reduced to a new balancing position where a low pressure output is maintained.

An additional advantage in situating the depressurization valve in the drain circuit for the pressure compensated valve as described above is that it permits the use of a lower cost valve since leakage and flow restrictions are not as critical as if the valve were placed in an alternative position.

BRIEF DESCRIPTION OF THE DRAWING

The drawing is a schematic illustration of the present variable displacement pump with a pressure compensated control and a depressurization circuit according to the present invention.

DETAILED DESCRIPTION OF THE PREFERRED EMBODIMENT

As illustrated in the drawing, an axial piston variable displacement pump 10 is provided of the general type disclosed in the Baits et al. Pat. 3,366,072, assigned to the assignee of the present invention.

Briefly, the pump 10 consists of an input shaft 12, adapted to be driven by a prime mover such as the prime mover of an aircraft, drivingly connected to a rotary cylinder block 14 having axially disposed cylinders 16 therein. The cylinder block 14 slidably engages the valve plate 18 having arcuate inlet and outlet ports 20 and 21 therein (shown diagrammatically in the drawing) of conventional construction. As the cylinder block 14 rotates under the driving force of input shaft 12 the cylinders 14 serially communicate with the inlet and outlet ports 20 and 21, respectively.

Slidably mounted in each of the cylinders 16 is a piston 25 which is adapted to be reciprocated by articulated rods 27 pivotally connected at one end to the pistons 25 and at the other end to a unitary camming ring 30 rotatably mounted on a cam or swashplate member 32. The cam or swashplate member is pivotally mounted in a housing (not shown) for adjustment about a transverse axis 33 for the purpose of varying the displacement of the hydraulic unit.

For supplying fluid to the pump 10 and for providing for the proper return movement of the pistons 25 as they pass over the low pressure port 20, a super charging pump 36 is provided which may be of the rotary vane type as shown in the drawing. Pump 36 supplies inlet fluid through passage 38 to the inlet port 20 of the pump.

For the purpose of relieving excess pressure in the housing or casing (not shown) associated with the pump 10, a case relief valve 43 is provided which includes two passages 45 and 46 both communicating with the inlet passage 38 through passage 48. One end of valve bore 50 associated with valve 43 communicates with the interior of the pump casing through a passage 52. Slidable within bore 50 is a valve member 54 biased to its lowermost closed position by a spring 56 as well as main system inlet fluid pressure from line 45. When the pressure of fluid in the casing exceeds a reasonable value, e.g. 700 p.s.i., the fluid in the casing will be dumped back into inlet passage 38 since the pressure on the underside of valve member 54 will exceed the downward force provided by spring 56 and inlet pressure so that the valve 54 moves upwardly opening passage 52 to passage 46 permitting this dumping to occur.

The pressure compensator valve 60 is provided for the purpose of controlling fluid pressure in a displacement control motor 62 connected to position the cam 32. The control motor 62 includes a cylinder 63 with a piston 64 therein biased in a stroke increasing direction by a spring 65. The spring 65 is of sufficient strength to move the cam 32 towards maximum displacement in opposition to the piston reaction forces acting on the cam in the absence of the normal control pressure in control pressure line 67 communicating with cylinder 63. With control pressure being supplied in line 67, spring 65 will compress because of the relative sizing of piston 64, and the cam 32 will move toward a zero displacement position.

The compensator valve 60 has for a general purpose the positioning of piston 64 to a balanced position where a substantially constant discharge pressure is maintained in the high pressure discharge passage 68 communicating with the pump outlet port 21. Toward this end the valve 60 includes a valve bore 69 having a supply passage 72 communicating with one end thereof and also communicating continuously with the high pressure passage 68 through passage 74. Also communicating with the bore 69 is a normally low pressure drain passage 76 which provides cooling fluid to the rotating components of the circuit through a throttle 77.

Slidable within bore 69 is a compensator valve member 78 having lands 80 and 81 separated by reduced stem portion 83. A coil compression spring 87 biases the valve member 78 to the right toward a position where control passage 67 communicates with normal drain passage 76 permitting the draining of fluid from cylinder 63. The pressure of spring 87 is adjustable by a suitable adjustable spring seat assembly 89 to control outlet pressure. The valve member 78 is biased to the left in opposition to spring 87 toward a position providing communication between supply passage 72 and control passage 67 by fluid pressure from supply passage 72 acting on the right end of valve land 80. There is some throttling across valve land 80 in the modulating position of the valve member 78 shown in the drawing so that the supply fluid pressure in passage 72 is greater than control fluid pressure in passage 67 under normal operating conditions.

A derivative compensating device 92 is provided to increase pump stability and to allow the pump to operate interchangeably in various installations without special "tuning" and in some cases it assists to compensate for large variations in the compressed volume of fluid in the system supplied by the pump 10. The compensation device 92 is seen to include a cylinder 93 with the piston 94 therein connected to the cam 32.

Also slidable within the cylinder 93 is a buffer piston 98 having an orifice 99 therein. The other end of the cylinder 93 communicates with the low pressure casing through passage 101.

As the piston 94 moves to the left during a reduction in the displacement of cam 32, fluid will be displaced from cylinder 93 through a feedback passage 103 to the left side of valve member 78 tending to assist the spring 87 in returning the valve to a modulating position and stabilize the valve. The buffer piston 98 is biased by a spring 106 to the right and serves to modify the effect of the feedback piston 94 by increasing the displacement volume of cylinder 93 after the piston 94 has moved to the left, and also by permitting leakage through the orifice 99 additional desirable control parameters are introduced into the feedback function of the fluid in line 103.

The pressure compensator valve 60 maintains the desired high pressure in conduit 68 by moving valve member 78 to the left when the pressure on the right end of the valve member exceeds the predetermined value desired in conduit 68, providing communication between passage 72 and control cylinder 63 reducing the displacement of cam 32 thereby reducing the pressure in conduit 68 to the desired value. The feedback flow in passage 103 assists in returning valve member 78 to its modulating position as the pressure in conduit 68 returns to its desired value. If the pressure in main conduit 68 and supply passage 72 falls below the predetermined desired value, spring 87 will move valve member 78 to the right permitting drainage from the control motor cylinder 63 allowing the biasing spring 65 to increase the displacement of cam 32 thereby increasing the discharge pressure in conduit 68. The resulting increase in pressure in supply passage 72 moves the valve member back to its modulating position against the biasing force of spring 87 as the desired predetermined pressure in conduit 68 is again reattained.

As discussed generally above, it is desirable under certain conditions to depressurize the pump and by that it is meant that the pump may be selectively reset to a relatively low discharge pressure to increase the life of the pump and to reduce the excess drag on the associated prime mover during start-up when pump delivery is not required.

Toward this end a depressurization valve 120 is provided which is operated by a solenoid 121a in a manner such that when the solenoid is deenergized that valve is deactivated and when the solenoid is energized by a suitable electric depressurization signal the valve becomes activated to depressurize the pump 10.

More specifically, the valve 120 includes a valve bore 121 having low pressure discharge passages 123, 124 and 125. Normally the high pressure supply fluid is delivered through the valve through passage 126 which connects with passage 74 communicating with the main pump discharge 68.

Slidable within valve bore 121 is a valve member 128 having lands 129, 130 and 131 separated by reduced stem portions 134 and 136. The valve member 128 is normally biased to its left deactivated position by a spring 142 seated within valve bore 121.

In the deactive position of the depressurization valve 120 the normally low pressure drain passage 76 communicates with drain passage 123 through passage 146, passage 125 and across reduced stem portion 134. At this time valve land 130 of depressurization valve member 128 prevents communication between high pressure fluid in passage 126 and the normal drain passage 76 associated with the pressure compensator valve 60. Thus, under these conditions, the depressurization valve 120 is deactivated and the pressure compensator valve controls the displacement of the pump 10 in its normal fashion to maintain a predetermined high pressure discharge through conduit 68.

When depressurization is desired the solenoid 121a is energized shifting valve member 128 to the right where land 129 blocks communication with passage 123 and communication is provided between high pressure passage 126 and passage 125 across reduced stem portion 134. As a result of this, the normal drain passage 76 associated with compensator valve 60 is pressurized with discharge pressure from passage 126 through passage 125 and passage 146. Thus, both sides of the land 80 associated with pressure compensator valve member 78 are pressurized so that the control motor 62 is pressurized overcoming the force of spring 65, reducing the displacement of the cam 32, and reducing the pressure in the main outlet conduit 68 to a relatively low value. Typical depressurization values in main conduit 68 are between 500 to 1,000 p.s.i. The predetermined depressurization pressure in passage 68 is maintained by balancing the forces on the cam 32 in a manner similar to the method achieved in balancing the forces on the cam to achieve the predetermined high pressure. That is, the spring rate of spring 65 is selected in relation to the size of the biasing piston 64 and the stroke reducing force provided thereby at the predetermined depressurization pressure value, along with the moments produced by the piston reaction forces on cam 32 so that the cam is balanced when the desired depressurization pressure is achieved in main conduit 68.

It is thus apparent that the depressurization valve effectively deactivates the pressure compensator valve 60 by pressurizing the normally low pressure or drain side of that valve.

In some cases it may be desirable to prevent flow from the pump 10 when it is depressurized. Toward this end a blocking valve 150 may be provided in the pump discharge conduit 68 which includes a movable valve member 151 selectively engageable with a valve seat 152 to block flow through the main conduit 68 to the system. The valve member 151 is pilot operated by valve stem 154 having a piston 156 fixed to the end thereof and slidable in a cylinder 158 with the piston biased downwardly urging the valve closed by a spring 160 seated in the upper end of cylinder 158. Communicating with the upper end of cylinder 158 is a passage 162 which also communicates with the drain conduit 123 or casing when the depressurization valve 128 is in its active position shown. Communicating with the lower end of cylinder 158 is a passage 164 which communicates with the depressurization valve bore 121 between lands 130 and 131 when the valve member 128 is in the inactive position shown.

Thus, when the depressurization valve 128 is deactivated passage 164 will be pressurized by discharge pressure from passage 126 across reduced valve stem portion 136, pressurizing the underside of piston 156 and moving the blocking valve member 151 to its open position shown in the drawing.

When the depressurization valve 128 shifts to its active or right position, passage 164 will communicate with a drain conduit 124 across reduced stem portion 136 depressurizing the lower side of cylinder 158, and passage 162 will be pressurized by communication with discharge pressure passage 126 across reduced stem portion 134 and passage 125, thereby pressurizing the upper side of cylinder 156 above piston 156 forcing the piston downwardly with the assistance of spring 160 closing the blocking valve 150 and preventing flow to the system when the depressurization valve 120 is activated.

When the depressurization valve is again deactivated passage 164 will be pressurized and passage 162 connected to drain thereby urging the valve member 151 upwardly against the opposing force of spring 160 thereby opening the valve and permitting high pressure fluid to flow to the system.

A check valve 170 may also be provided in the high pressure discharge passage 68 for the purpose of preventing reverse flow through a filter (not shown) provided in the high pressure passage and also for preventing reverse motoring of the pump 10 if the pump is not being rotated and the system is pressurized from another source.

I claim:

1. A hydraulic energy translating pump, comprising: valve means having inlet and outlet ports therein, a cylinder block rotatable relative to said valve means and having cylinders therein serially communicable with said inlet and outlet ports, cam means for reciprocating said pistons in said cylinders, fluid operable means controlling the cam means to vary the displacement of the unit, a constant pressure control valve responsive to pump outlet pressure and having a motor port for selectively porting fluid between said valve and said fluid operable means, passage means for normally supplying fluid under pressure to said valve, passage means for normally draining fluid from said valve, said valve including a movable valve member selectively connecting said supply passage means or said drain passage means to said motor port, and second valve means for selectively reversing the function of one of said passage means from drain to supply or supply to drain so that the control valve member may be rendered substantially ineffective to control said fluid operable means.

2. A hydraulic energy translating pump as defined in claim 1, wherein said fluid operable means is movable from a position of substantially zero displacement to a maximum displacement position, resilient means biasing said fluid operable means toward one of said positions.

3. A hydraulic energy translating pump as defined in claim 2, wherein said resilient biasing means biases said fluid operable means toward the maximum displacement position, said valve means supplying fluid under pressure to said normal drain passage means so that both of the passage means are pressurized, said fluid operable means being sized such that when both of the passage means are pressurized the force of the biasing means will be overcome and the fluid operable means will move to a reduced displacement position.

4. A hydraulic energy translating pump, comprising: valve means having inlet and outlet ports therein, a cylinder block rotatable relative to said valve means and having cylinders therein serially communicable with said inlet and outlet ports, cam means for reciprocating said pistons in said cylinders, fluid operable means controlling the cam to vary the displacement of the unit, a pressure compensator control valve for controlling fluid to said fluid operable means to maintain a substantially constant discharge pressure in said outlet port, said control valve having normal supply passage means and normal drain passage means, and means for pressurizing the normal drain passage means to disable said control valve.

5. A hydraulic energy translating pump as defined in claim 4, including resilient means biasing said fluid operable means toward maximum displacement, a valve member in said control valve adapted to port fluid from said fluid operable means in response to decreasing pump discharge pressure to increase displacement of the unit and to port fluid to said fluid operable means in response to increasing pump discharge pressure to reduce displacement of the unit, resilient means biasing said valve member in a direction connecting said drain passage means to said fluid operable means, means communicating fluid pressure in said outlet port to urge the valve member in a direction opposite said one direction connecting said supply passage means to said fluid operable means.

6. A hydraulic energy translating pump as defined in claim 5, wherein said supply passage means communicates with said outlet port means, said means for pressurizing said drain passage means including a depressurization valve having a movable valve member, a drain passage associated with said depressurization valve, a supply passage associated with said depressurization valve and communicating with said outlet port, said depressurization valve when in a deactive position communicating said drain passage means with said drain passage and blocking said depressurization supply passage from said drain passage means, said depressurization valve member being movable to an active position communicating said depressurization supply passage with said drain passage means and blocking communication between said drain passage and said drain passage means.

7. A hydraulic energy translating pump as defined in claim 5, wherein said biasing means and said fluid operable means are sized so that when the function of said one passage means is reversed the fluid operable means will move to a new reduced displacement position providing reduced outlet fluid pressure from said outlet port means.

8. A hydraulic energy translating pump as defined in claim 7, wherein said hydraulic pump is of the axial piston type, the pistons exerting a net moment on said cam member that varies with displacement, said biasing means urging said fluid operable means in a stroke increasing direction with a decreasing force as the fluid operable means approaches maximum displacement, said biasing means, said net moment and the fluid in said fluid operable means balancing said fluid operable means when the passage means are performing their normal function to maintain a predetermined high pressure discharge from said outlet port and balancing said fluid operable means when the function of the normal drain passage is reversed to a pressure passage to maintain a predetermined low pressure discharge from said outlet port.

9. A hydraulic energy translating pump as defined in claim 5 including feedback means driven by the fluid operable displacement varying means and supplying a feed back signal to the control valve in opposition to the signal from the output port.

10. A hydraulic energy translating pump as defined in claim 9, wherein the feedback means comprises a piston driven by the displacement varying means, and fluid means actuated by the piston and acting on the valve.

References Cited

UNITED STATES PATENTS

| 3,252,426 | 5/1966 | Parr | 103—162 |
| 3,252,419 | 5/1966 | Tyler | 103—2 |
| 2,543,624 | 2/1951 | Gabriel | 103—162 |
| 2,888,810 | 6/1959 | Hann | 103—162 |
| 3,183,844 | 5/1965 | Pitt et al. | 103—162 |
| 3,365,886 | 1/1968 | Moon, Jr. | 103—162 |

WILLIAM L. FREEH, Primary Examiner

U.S. Cl. X.R.

417—206, 228